Aug. 11, 1931.          O. A. ROSS          1,818,651
SEAL
Filed April 7, 1927
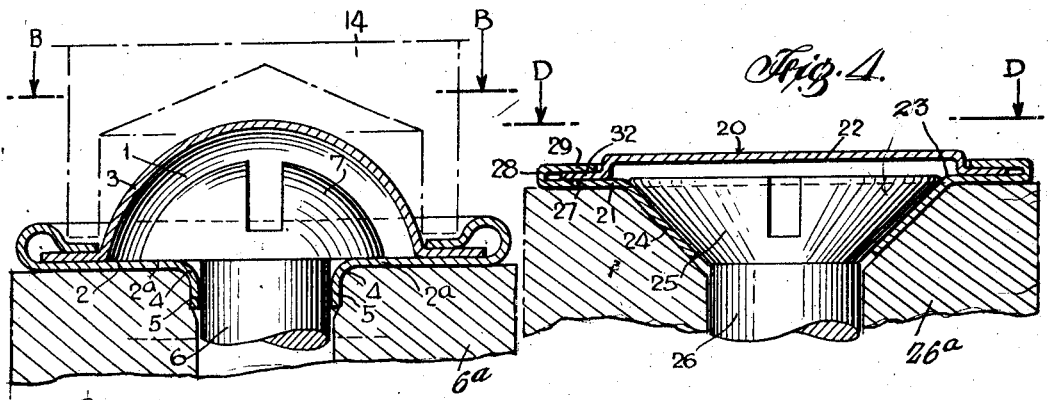
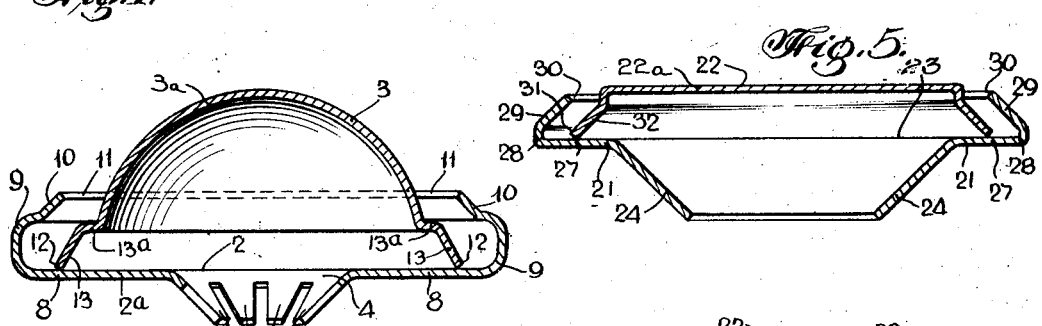
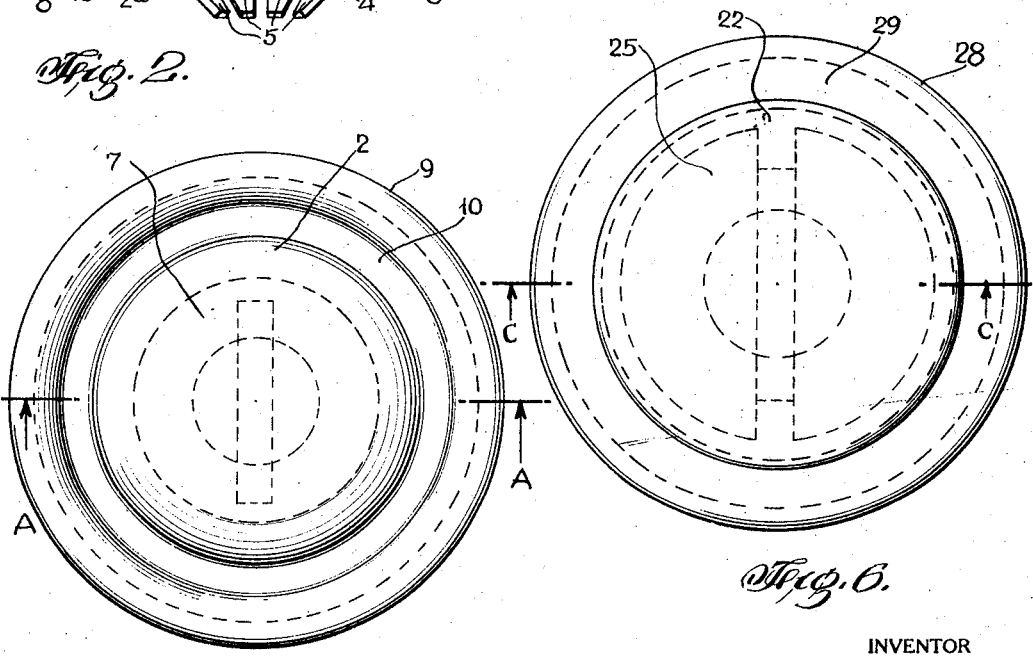
INVENTOR
Oscar A. Ross Patented Aug. 11, 1931

1,818,651

UNITED STATES PATENT OFFICE

OSCAR A. ROSS, OF NEW YORK, N. Y.

SEAL

Application filed April 7, 1927. Serial No. 181,810.

This invention relates to seals and more particularly to seals comprising a combined interlocked washer and cover for sealing the heads of fasteners, as described in my co-pending application, Serial Number 180,798, filed April 4th, 1927, and of which this instrument forms a continuing application for Letters Patent.

One of the objects of this invention is to furnish an ornamental seal comprising two semi-formed members arranged to enclose the protruding portion of a fastener as the members are interlocked together over the fastener during the complete forming of the semi-formed members.

Another object of the invention is to furnish a readily applicable seal for covering the protruding portion of screws, bolts, bolt ends or nuts of building hardware whereby the removal of said fasteners by theft is made more difficult.

Another object is to furnish an ornamental covering for hardware fasteners, whereby ordinary low cost fasteners may be employed at substantially all points and said coverings may be selected to match the design or finish of the hardware secured by said fasteners.

Another object is to furnish a seal for the protruding ends of fasteners of a form whereby said seal may be attached with an ordinary short length of metal tubing thereby avoiding the supplying of special tools for the attachment of said seals.

Another object is to furnish a two part semi-formed seal, the parts of which may be temporarily secured together for stock or storage purposes before the attachment of said seals to the protruding ends of allocated fasteners.

Other objects and advantages will appear as the description of the invention progresses, and the novel features of the invention will be pointed out in the appended claims.

This invention consists in the novel construction and arrangement of parts hereinafter described, delineated in the accompanying drawings, and particularly pointed out in that portion of this instrument wherein patentable novelty is claimed for certain and peculiar features of the device, it being understood that, within the scope of what hereinafter thus is claimed, divers changes in the form, proportions, size and minor details of the structure may be made without departing from the spirit of, or sacrificing any of the details of the invention.

In describing the invention in detail, reference is had to the accompanying drawings, wherein I have illustrated embodiments of my invention, and, wherein like characters of reference, designate corresponding parts throughout the several views, and, in which:—

Figure 1 is a part sectional, part elevated view of a seal, the washer and cover of which have been locked together to form a seal over the round head of a fastener, and is taken on line A—A of Fig. 3, and Fig. 2 is a sectional view of a washer and cover for round headed fasteners, shown temporarily assembled for finishing, shipment, and/or, stock, and, Fig. 3 is a top view of the seal shown in Fig. 1 and is taken on line B—B of Fig. 1 and, Fig. 4 is a part sectional, part elevated view of a seal, the washer and cover of which have been locked together to form a seal over a flat headed fastener and is taken on line C—C of Fig. 6, and Fig. 5 is a sectional view of a washer and cap for flat headed fasteners, shown temporarily assembled together, for the purpose of finishing, shipment, and/or, stock, and, Fig. 6 is a top view of the seal shown in Fig. 4 taken on line D—D thereof.

Figs. 1, 2 and 3 illustrate a preferred form of seal as 1, for round headed fasteners, and comprises washer 2, shown interlocked with cover 3, in Fig. 1. Washer 2 comprises center portion 2a having centrally located frustro conically formed portion 4, slotted to form gauging prongs 5—5, adapted to impinge against body 6, of screw 7, arranged to be sealed by seal 1. Adjoining the outer edge of center portion 2a, is semi-formed interlocking portion 8, comprising bead 9, and frustro-conical semi-formed locking portion or rim 10, the edge 11, of which is constrained to snap over the edge 12, of frustro-conical semi-formed locking portion or rim 13, forming a portion of cover 2. Washer 2, and cover 3, are preferably locked together as the semi-formed locking portions 10 and 13 are completely formed by the downward movement of a tubular member, or tool, as 14, shown in dotted lines of Fig. 1.

Referring to Figs. 4, 5 and 6, illustrating a preferred form of seal, as 20, for flat headed screws, and comprising washer 21, and cover 22, shown locked together, in Fig. 4, washer 21, comprises center portion 23, a portion of which has been formed into the frustro conically formed portion 24, adapted to receive flat head 25, of fastener 26. Adjoining said portion 23, is locking section 27, comprising bead 28 and frustro-conical semi-formed locking rim 29, the edge 30, of which is constrained to snap over the edge 31, of lock rim 32, forming part of cover 22.

It is to be noted that when the semi-formed frustro-conical locking rim 10, is forced downwardly by a tool, as 14, its impingement upon the flat annular portion 13a, of rim 13, causes said last named rim to be constrained downwardly and outwardly, whereas semi-formed frustro-conical locking rim 10, of washer 2, is constrained downwardly and inwardly. Likewise as semi-formed frustro conical locking rim 29, of washer 21, is forced downwardly by a forming tool, (not shown) it is also constrained inwardly until it impinges on frustro conical locking rim 32, of cover 22, whereupon said last named rim is constrained outwardly as well as downwardly, as said semi-formed locking rims are completely formed by said tool or tubular member.

The locking method just described is a reversal of the method described in applicant's application for Letters Patent Serial Number 180,798, filed April 4th, 1927, and wherein the locking rim of the cover is constrained inwardly and downwardly and the locking rim of the washer is constrained outwardly and downwardly.

Whereas the seals when completely formed as described in this instrument, do not constitute as finished an appearance as the seals disclosed in the hereintofore mentioned application for Letters Patent, they may be manufactured at a slightly lower cost and therefore have meritorious value.

The washers, as 2, and 21, and covers as 2, and 22, are manufactured as a semi-formed article, as prior to being temporarily assembled for packaging.

It is obvious that if desired the head 9 of cover 3, may be made flat, as shown in Figs. 4, 5 and 6. Also that if desired, a bead as 9, may be added to the cover 22, of the seal 20, shown in Figs. 4, 5 and 6.

It is also obvious that the heads 3a and 22a may be varied in form as disclosed in the aforesaid co-pending application for Letters Patent. Also that the washers as 2 and 21, and covers as 3 and 22, may be formed from unfinished material and subsequently specially finished, as required, or they may be formed from finished materials and thereafter stocked or shipped.

What I claim is:—

1. An article of manufacture adapted to be applied to the exposed portion of a removable fastener which comprises:—an orificed washer member through which the fastener protrudes arranged to be positioned and form the base of the article as the fastener is secured in place, an upwardly and inwardly extending semi-formed locking rim member forming the peripheral portion thereof, a cap or seal member arranged to enclose the exposed portion of the fastener, and a semi-formed locking rim member formed thereon as the peripheral portion thereof arranged to be surrounded by the washer locking rim member and be bent into interlocked relation therewith as the locking rim members are completely formed to effect a seal over the exposed portion of the fastener.

2. An article of manufacture adapted to be applied to the exposed portion of a removable fastener which comprises; an orificed washer member through which the fastener protrudes arranged to be positioned and form the base of the article as the fastener is secured in place, an upwardly and inwardly extending semi-formed locking rim member forming the peripheral portion thereof, a cap or seal member arranged to enclose the exposed portion of the fastener, and a downwardly and outwardly extending semi-formed locking rim member formed as the peripheral portion thereof arranged to be surrounded by the washer locking rim member and be bent into interlocked relation therewith as the locking rims are completely formed to effect a seal over the exposed portion of the fastener.

3. An article of manufacture adapted to be applied to the exposed portion of a removable fastener which comprises; an orificed washer member through which the fastener protrudes arranged to be positioned and form the base of the article as the fastener is secured in place, a frustro-conical semi-formed locking rim member forming the peripheral portion thereof, a cap or seal member arranged to enclose the exposed portion of the fastener, and a semi-formed locking rim member formed as the peripheral portion thereof arranged to be surrounded by the washer locking rim member and be bent into interlocked relation therewith as the locking rim members are completely formed to effect a seal over the exposed portion of the fastener.

4. An article of manufacture adapted to be applied to the exposed portion of a removable fastener which comprises; an orificed washer through which the fastener protrudes arranged to be positioned and form the base of the article as the fastener is secured in place, a frustro conical semi-formed locking rim member forming the peripheral portion thereof, a cap or seal member arranged to enclose the exposed portion of the fastener, and a frustro-conical semi-formed locking rim member formed as the peripheral portion thereof arranged to be surrounded by the washer locking rim member and be bent into interlocked relation therewith as the locking rim members are completely formed to effect a seal over the exposed portion of the fastener.

Signed at New York city, in the county of New York, and State of New York. April, 1927.

OSCAR A. ROSS.